June 9, 1959 S. M. SHELTON 2,890,111
METHOD OF MANUFACTURING TITANIUM AND TITANIUM ALLOYS
Filed March 30, 1956
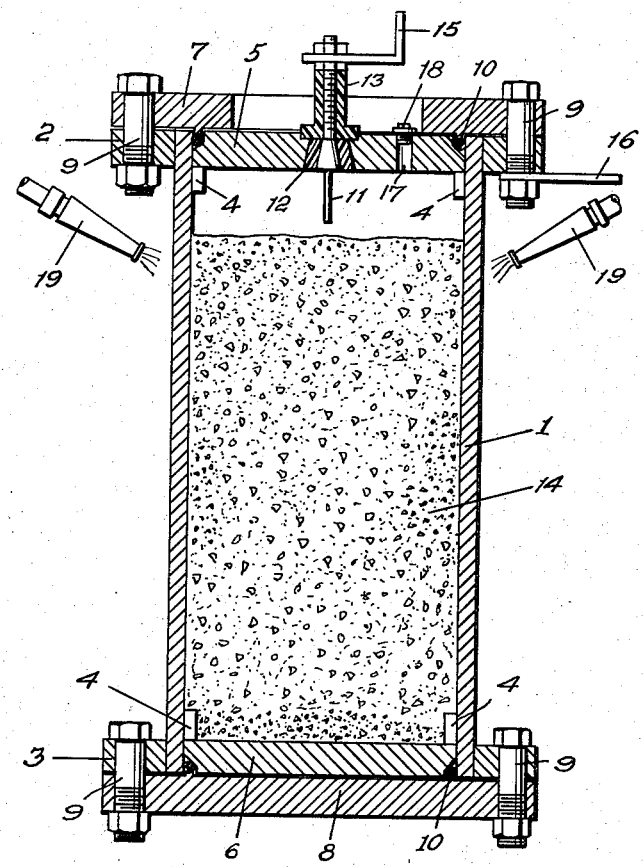
INVENTOR.
Stephen M. Shelton
BY
W. E. Thibodeau, A. W. Dew
& M. W. Bachrach
ATTORNEYS

United States Patent Office 2,890,111
Patented June 9, 1959

2,890,111

METHOD OF MANUFACTURING TITANIUM AND TITANIUM ALLOYS

Stephen M. Shelton, Albany, Oreg., assignor to the United States of America as represented by the Secretary of the Army Application March 30, 1956, Serial No. 575,287

1 Claim. (Cl. 75—84.4)

(Granted under Title 35, U.S. Code (1952), sec. 266)

The invention described herein may be used by or for the Government for governmental purposes without the payment to me of any royalty thereon.

This invention relates to the manufacture of titanium and titanium alloys and more particularly to a method and apparatus for producing titanium and its alloys in a highly pure and uniform condition.

The basic chemistry of this invention is substantially that previously employed. A titanium halide, particularly titanium tetrachloride, is reduced by an alkali or alkaline earth metal such as sodium, magnesium, calcium, or combinations of these metals at a high temperature. Two typical reactions are as follows:

(1) 
$$TiCl_4 + 4Na \rightarrow Ti + 4NaCl$$

(2) 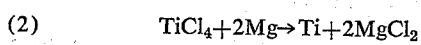
$$TiCl_4 + 2Mg \rightarrow Ti + 2MgCl_2$$

My invention consists in providing means for accomplishing a rapid reaction while maintaining the contact zone between the reactor walls and the reacting mass realtively cool. This is accomplished by initiating the reaction centrally of the mass and propagating the reaction outwardly toward the walls of the reactor and, at the same time, cooling the reactor walls. By this method a high temperature and pressure can be maintained in the area of the reaction to accelerate the relation whereas the temperature and pressure at the reactor walls is kept within acceptably low limits, the condensation of the gases of reaction against the relatively cool reactor walls serving to maintain a low pressure in the vicinity of the walls. This procedure permits a rapid reaction due to the fact that the heat liberated by the reaction once it is initiated is sufficient to sustain the reaction to completion and is limited only by the capacity of the reactor to withstand the gas pressures produced.

By maintaining the zone between the reaction mass and the reactor walls relatively cool, contamination of the titanium end product by diffusion of the iron or other reactor metals into the titanium is inhibited. By maintaining the titanium halide relatively free from contact with air while piping it into the reactor and by preventing leakage of air into the reactor chamber, the amount of contamination present in the end product is further reduced. The high pressure within the reactor prevents air leakage therein. And by accomplishing the reaction in the least time possible, the opportunity for contamination to take place is reduced to a minimum and the cost of the operation is substantially reduced.

It is well known that components of the reactor such as iron, steel and other metals lose strength rapidly with increase in temperature. Therefore, a higher pressure may be maintained by cooling the reactor walls, it being a fact that the higher the pressure maintained the faster the reaction will progress.

According to one prior art method of manufacturing titanium, magnesium or sodium is charged into a reactor furnace and the furnace heated to the reacting temperature of about 800° to 900° C. Above this temperature the titanium will tend to absorb some of the metal of the reactor with which it comes into contact. Titanium tetrachloride is then sprayed into the furnace, it being necessary to retard the spray rate sufficiently to maintain low internal pressure within the reactor chamber of the furnace. The molten magnesium chloride or sodium chloride, byproducts of the reaction, is tapped periodically from the furnace. When the reaction is complete the reaction chamber is removed from the heating or combustion chamber before the reaction chamber has had a chance to cool. The result of the reaction is to reduce titanium tetrachloride to titanium metal sponge, the sponge being dispersed in a mass of either sodium chloride or magnesium chloride. This mixture must be taken from the furnace and either distilled in a vacuum or leached with water or acid to remove the chloride salts. Extreme care is necessary to minimize contamination of the porous, fine particle, pyrophoric titanium sponge either by contact with air, particularly if warm or humid, or contact with water or acid. The final purified sponge must be cold compacted or briquetted before it is melted in an arc furnace. Once the metal has been melted into massive form it defies contamination provided it is not overheated.

The prior art method has many disadvantages. During the prolonged reduction operation when the partially reduced metal is in contact with the walls of the reactor, both of which are at high temperatures, there is inevitable diffusion of metallic impurities from the walls of the reactor to the titanium. Thereby, each batch of titanium sponge is subject to contamination, the amount of contamination varying from a maximum in the vicinity of the reactor walls to a high purity metal in the center of the reactor. In addition, any small or sudden inadvertent leaks of air into the reacting furnace during the protracted reduction time will contaminate that portion of the titanium sponge which first comes in contact with the incoming air.

Consequently, any single batch of titanium sponge lacks complete uniformity of contamination and even with the current practice of carefully blending and double melting of titanium into ingot, it is inevitable that small pieces of highly contaminated sponge will carry over into a zone of contaminated metal within the ingot.

The prior art method requires many hours of time and high handling costs. Repeated heating of the reaction chamber and contact with titanium sponge when both the reaction chamber and titanium are hot results in a relatively short useful life for the reaction chamber.

One object of the present invention, therefore, is to provide a novel apparatus for manufacturing titanium and titanium alloys.

Another object of the invention is to provide a novel method for manufacturing titanium and its alloys.

A further object is to provide a method as above which is compatible with the apparatus of this invention.

A still further object is a method of manufacturing titanium adapted to produce a metal of high purity, the slight contamination remaining being uniformly distributed.

An additional object is a method of manufacturing titanium and its alloys which is rapid, economical, and highly efficient.

The specific nature of my invention as well as other objects and advantages will be apparent from the following description and drawing wherein:

The figure is an axial sectional view of the apparatus in accordance with this invention.

The figure shows a reactor for the manufacture of titanium having a casing 1 in the preferred form of a mild-steel tube and having a pair of flanges 2 and 3 affixed to the casing at opposite ends thereof. A plurality of lugs 4 are affixed to the inner wall of casing 1 adjacent the two ends thereof for the purpose of supporting closure plates 5 and 6, said plates adapted to seat upon said lugs, plate 5 aligning with flange 2 and plate 6 aligning with flange 3. An additional pair of plates, end plates 7 and 8, are positioned adjacent closure plates 5 and 6 and are attachable to flanges 2 and 3, respectively, by means of bolts 9. A seal is provided between each pair of adjacent end plates and closure plates by the provision of O-rings 10.

An electrode of titanium 11 is insulated from closure plate 5 by conical washer 12 and insulating sleeve 13, one end of the electrode being in proximity to the charge 14 of a reducing agent such as sodium. Electrode 11 is connected through a bus bar 15 to one terminal of a direct current source, not shown. A second bus bar 16 is connected between the flange 2 and the opposite terminal of the direct current source.

An inlet 17 is provided in closure plate 5, plug 18 being receivable within the inlet by threaded engagement with closure plate 5. Spray nozzles 19, which may be mounted in any convenient manner, are directed at the outer wall of casement 1.

The preferred method of manufacturing titanium in accordance with this invention comprises removing end plate 7 and closure plate 5 from the reactor and filling the reactor chamber with an inert gas, such as argon, and metallic sodium, the sodium being in coiled strips. The level of fill must be such that the sodium is just out of contact with electrode 11 when closure plate 5 is replaced. Iodine is then added as a thermal booster in a ratio of approximately one pound of iodine to five pounds of metallic sodium. The two plates previously removed are replaced and the seal between them made tight by snugging down bolts 9. Next, liquid titanium tetrachloride is piped into the reacting chamber through inlet 17, the ratio of titanium tetrachloride to the metallic sodium previously charged into the reactor being approximately 2:1 by weight. The residual space in the chamber is evacuated and back filled with argon through inlet 17 to atmospheric pressure to remove the last traces of air. Inlet 17 is then plugged. The normal temperature within the reaction chamber at this time is approximately 25° C. During the charging operation, care must be taken to limit as much as possible the contact of the titanium tetrachloride with air in order to prevent contamination which will result from that contact. Titanium tetrachloride, being in a liquid state, may be charged into the reactor through pipes which serve to maintain the liquid free from contact with air.

The reaction is initiated by an electrical arc which is struck between the titanium electrode and the metallic sodium at 500 amperes and 30 volts for a few seconds. The conductive path is from the electrode 11, through bus bar 15, to the direct current source, not shown. And from the direct current source through bus bar 16, flange 2, casing 1, metallic sodium 14, and across the air gap back to electrode 11. The heat generated at the air gap is sufficient to start the reaction at the portion of the charge 14 adjacent the electrode 11.

As will be noted in the drawing the charge 14 does not completely fill the reactor 1, but is of such quantity as to leave a head space between the top of the charge and the closure plate 5. This insures that when the reaction is initiated, it is initiated remote from all of the walls of the reactor to prevent contamination of the titanium with the reactor wall material.

As soon as the casing 1 of the reactor near the top of charge 14 reaches 200° C., water or other coolant is sprayed over the whole of the reactor. The reactor should cool to approximately 100° C., and remain at that temperature while the reaction continues. When the temperature of the reactor begins to fall slowly from that temperature the reaction is complete. The spray should be continued, however, for at least two hours after completion of the reaction, the reactor being at room temperature at the end of this time.

All the plates are removed from the reactor and the fused mixture of titanium metal and sodium chloride is cracked and pressed from the chamber. The excess sodium which accumulates at the top of the chamber is separated. The fused mixture is leached in water to remove soluble sodium chloride, leaving metallic titanium which is rinsed and dried.

In a test of this invention using a small scale reactor it was found that, of the recovered metal, 80.6% was in massive lumps ½ inch to 4 inches in size, 6.4% was sintered or semifused, and the balance was in small particles less than 14 mesh in size. There was no sign of alloying or erosion on the inside walls of the reactor. It is apparent that a large percentage of the titanium would be in massive lumps in a larger reactor operated under otherwise similar conditions. Spectographic analysis of a sample of the massive titanium showed in parts per million:

Al 20; Fe 50; Cu 20; Pb 10; Cr 10; Si 400; Mg 10; Ni 15; Mn 10; Na 50.

While only one preferred embodiment of the invention has been shown and described, it will be obvious to those skilled in the art that it is not so limited, but is susceptible of various other changes and modifications without departing from the spirit thereof, and it is desired therefore, that only such limitations be placed thereupon as are imposed by the prior art or as are specifically set forth in the appended claim.

I claim:

A batch method of manufacturing titanium and titanium alloys which comprises depositing within a reaction chamber a reducing agent selected from the group consisting of alkali and alkaline earth metals, closing said reaction chamber, piping a liquid titanium halide into said chamber to form a reaction mass with said reducing agent, the reaction mass being of such quantity as to leave a head space in said chamber, evacuating said head space in said chamber and back filling with an inert gas, then sealing said chamber so as to be pressure tight, and subsequently initiating a reaction of the reaction mass only at a point located inwardly and remote from the walls of the reaction chamber and adjacent said head space by raising the temperature of the reaction mass at said point, the reaction of the reaction mass propagating outwardly from said point toward the walls of the reaction chamber, and cooling the walls of the reaction chamber during the reaction to prevent contamination of the titanium by the chamber wall material.

References Cited in the file of this patent

UNITED STATES PATENTS

| Number | Name | Date |
|---|---|---|
| 783,413 | Brightbill | Feb. 28, 1905 |
| 1,415,516 | Bridge | May 9, 1922 |
| 2,205,854 | Kroll | June 25, 1940 |
| 2,744,006 | Winter et al. | May 1, 1956 |
| 2,763,542 | Winter | Sept. 18, 1956 |
| 2,782,116 | Spedding et al. | Feb. 19, 1957 |
| 2,785,065 | Spedding et al. | Mar. 12, 1957 |
| 2,843,477 | Booge | July 15, 1958 |

FOREIGN PATENTS

| Number | Country | Date |
|---|---|---|
| 505,801 | Belgium | Sept. 29, 1951 |
| 1,074,024 | France | Mar. 31, 1954 |

OTHER REFERENCES

Lely et al.: Z. Anorg. Chem., vol. 87, published 1914, pp. 209–228; p. 216 pertinent.